United States Patent Office 3,462,663
Patented Aug. 19, 1969

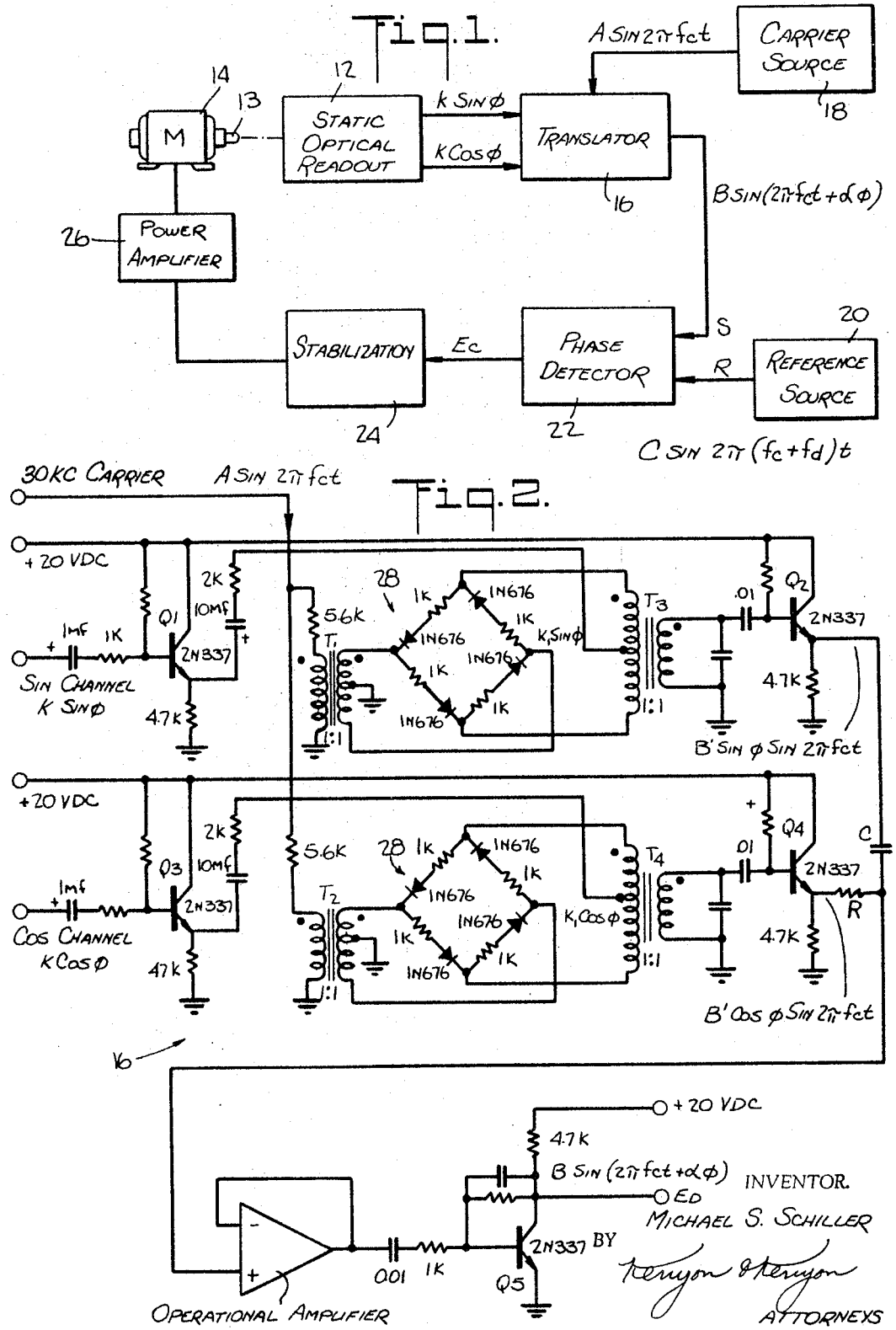

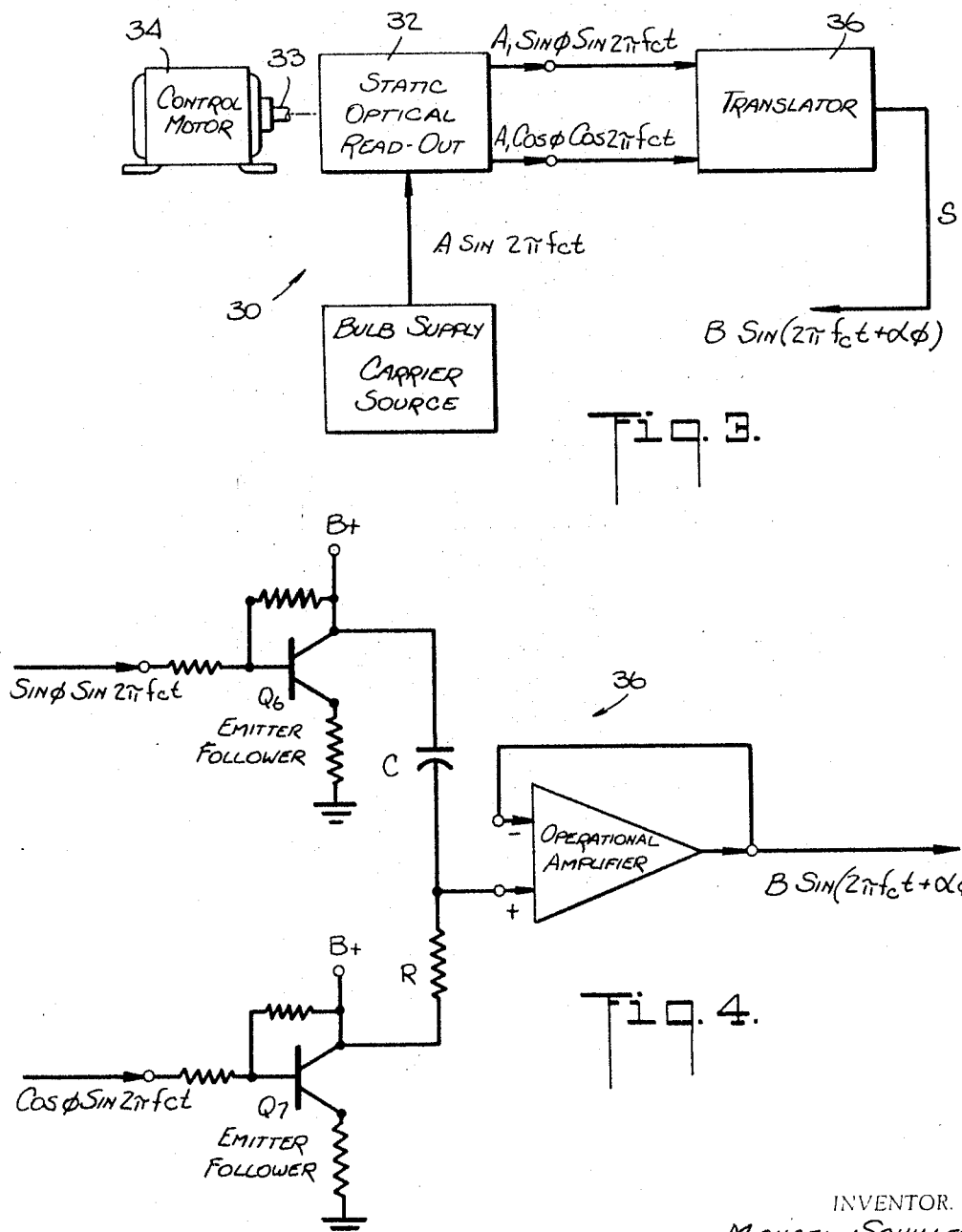

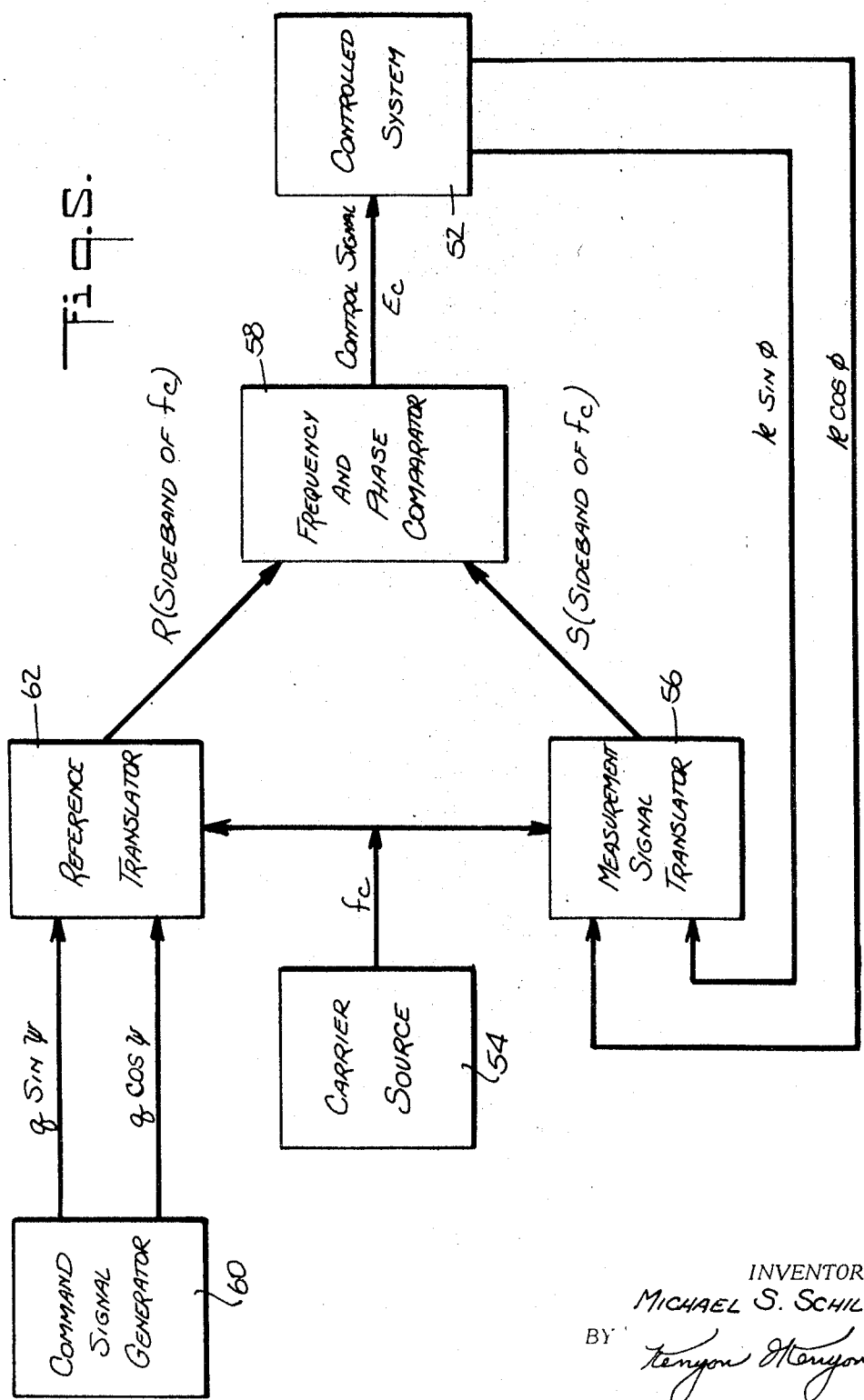

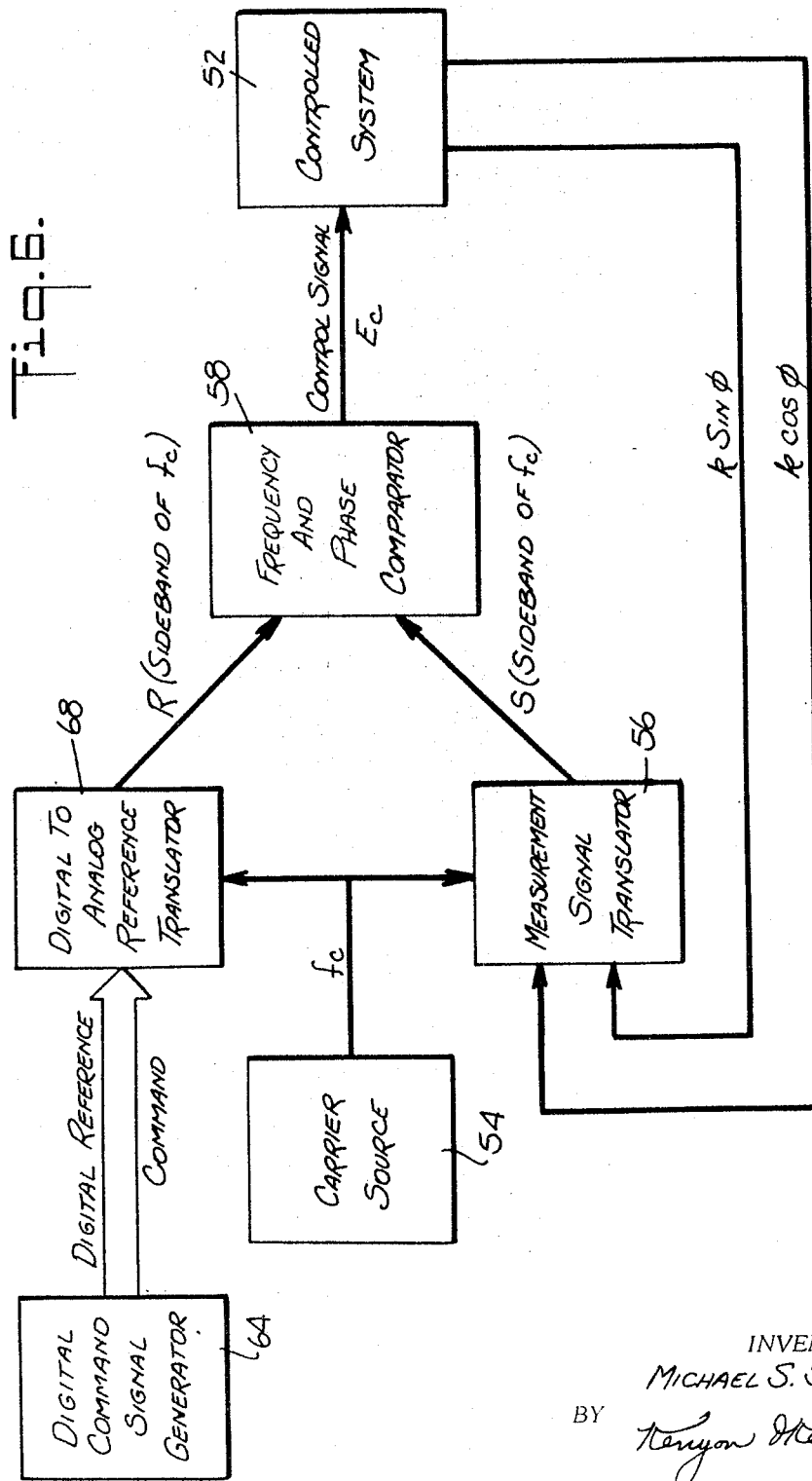

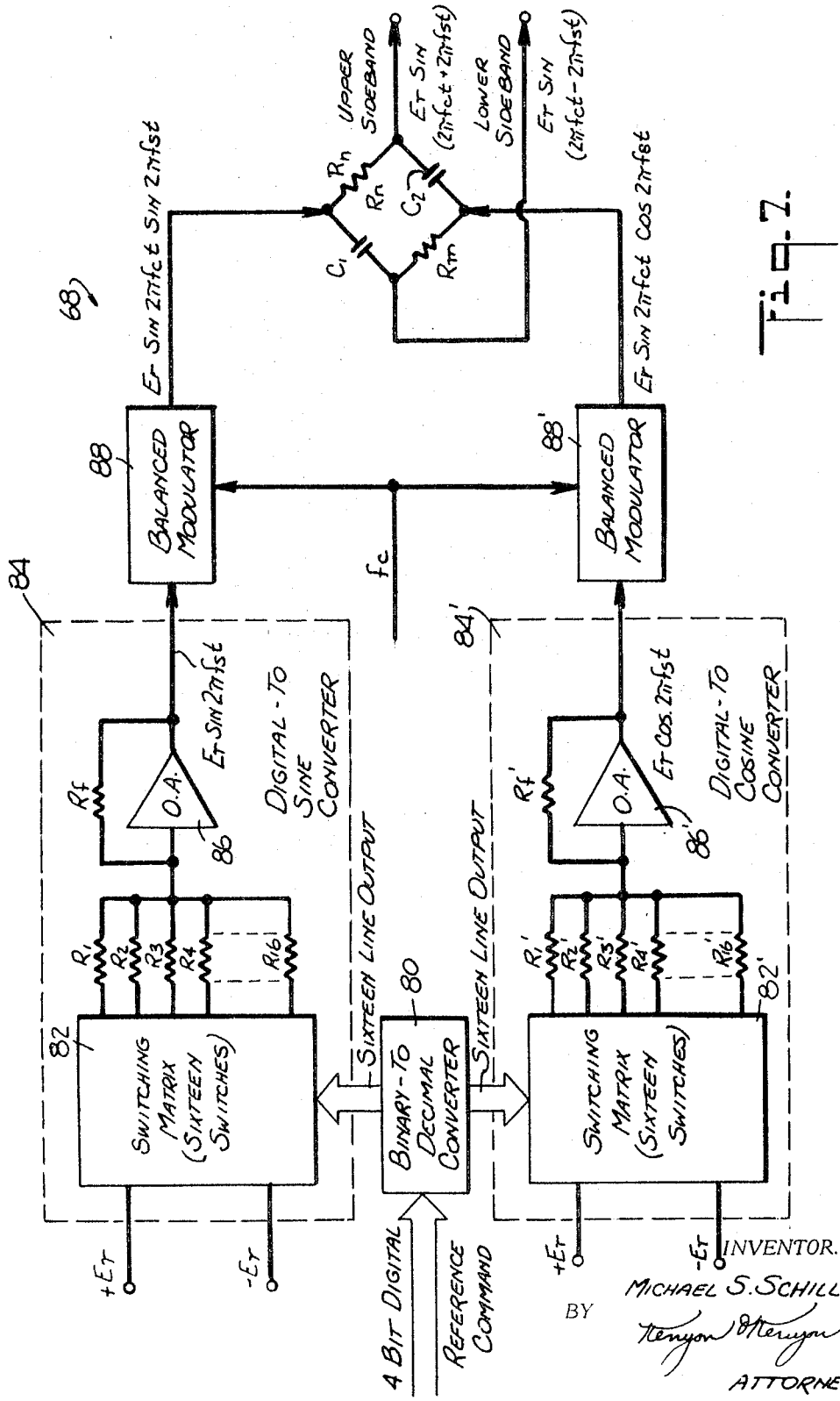

3,462,663
SYSTEM FOR CONTROLLING MOTOR
SPEED AND POSITION
Michael S. Schiller, New York, N.Y., assignor to Sequential Information Systems, Inc., Elmsford, N.Y., a corporation of New York
Continuation-in-part of application Ser. No. 353,685, Mar. 23, 1964. This application Feb. 29, 1968, Ser. No. 729,846
Int. Cl. H02p 5/46, 7/68, 7/80
U.S. Cl. 318—18                                    18 Claims

ABSTRACT OF THE DISCLOSURE

The control system embodiments disclosed involve the control of a parameter such as motor shaft angle position and/or rotational speed by comparing a measurement signal from the device being controlled with a reference signal. An upper side band of a measurement signal modulation of a carrier signal is compared with a reference signal derived from the same carrier signal. The reference signal may be the same upper side band of a command signal modulation of the carrier signal. These two upper side bands are compared by a device, such as a phase comparator, to provide a control signal for the motor or other device being controlled; whereby the useful range of the shaft transducer which is normally only used for speed detection is extended downwardly to also provide position information.

CROSS REFERENCE TO RELATED APPLICATION

This application is a continuation-in-part of Ser. No. 353,685, filed on Mar. 23, 1964, now abandoned, by Michael S. Schiller.

BACKGROUND OF THE INVENTION

This invention relates in general to a control system and more particularly to a system for accurately controlling the frequency and phase of a parameter (such as motor shaft rotational speed and position) in a controlled system. As will be seen, the invention is uniquely adapted to low motor speed applications.

The invention is fundamentally a device for controlling some parameter such as position and rotational speed that can be related to a signal phase and frequency. In most contemplated applications, the phase and frequency measurement parameters will represent or correspond to position and speed operational parameters. Thus control of phase and frequency (or from another point of view, response to phase and frequency) will mean control of position and speed of some device such as a motor. However, in broadest terms any operational parameter which can be measured by virtue of the phase and frequency values of a measurement signal can be controlled by means of this invention.

Control systems which are responsive to phase and frequency in order to control position and speed are well known in the control art. Probably the major line of development in such systems relates to techniques to achieve ever greater accuracy and versatility. Greater accuracy is obviously always a value in the control art. Greater versatility is a value in that it permits a single system to provide control of both position and speed from a zero speed condition to a very high shaft angle rotational speed.

It should be noted in connection with this specification that the objects of the invention and the embodiments described will be discussed primarily in terms of applications where the control system serves to control the shaft angle position and/or rotation speed of a motor. Not only is this the primary presently contemplated application for the control system invention but it is also much easier to understand the operation of the control system if it is presumed that the control system is connected to a controlled system wherein a motor shaft angle position and/or rotational speed is the parameter ultimately being controlled. However, it should be understood that nothing herein is intended to limit the application of the control system of this invention to the control of motor shaft angle position and/or rotational speed.

The invention operates in a closed-loop phase-lock system which is a system for controlling the speed of a motor by comparing the phase and frequency of a first signal that is obtained from a transducer coupled to the shaft of the motor with a second signal that is obtained from a reference source. The power delivered to the motor is a function of the phase angle between the transducer signal and the reference signal. Thus power is delivered which brings the motor to a speed that provides a transducer signal having exactly the same frequency as that of the reference signal. In this fashion the frequency of the reference signal determines the speed of the motor. Variations in load on the motor that require variations in the total amount of power delivered are handled by a change in the phase angle between the transducer signal and the reference signal. Thus the motor speed is locked to the reference frequency and the phase angle between the two frequencies varies to accommodate loading requirements. Accordingly, the term "phase-lock system."

A fair degree of control over the position (or phase) of the shaft may be obtained by use of such devices as an optical read-out in the transducer where a large number of lines are inscribed on the disc that provides the optical encoder track. The transducer signal will go through 360° as the shaft rotates by an amount equal to the angle subtended by two adjacent lines on the disc. Thus shaft position can then be controlled to within the angle between successive lines on the disc.

The above-described use of a transducer coupled to the shaft of the motor to provide a signal whose frequency is a function of the speed of motor rotation is the standard technique employed in all phase-lock motor control systems. However, in any given system, there has always been some minimum motor speed below which the system becomes non-operative. The fundamental cause of the non-operative nature of these systems at very low motor speeds is that the transducer frequency becomes less than the rate at which torque perturbations arise and thus there is a failure to control the motor to overcome these perturbations. Thus the prior art systems cannot be used to control motors at, for example, earth rate speeds. A fortiori, previously known phase-lock systems are useless for zero speed control.

More specifically, the prior art transducer and system provides information by sampling the position of the rotating motor shaft. The transducer operates so that the shaft position information is sampled at a rate proportional to the speed of the motor. The transducer may well be designed to provide a large number of separate bits of information for each 360° rotation of the motor shaft, but, nonetheless, the rate at which information is supplied from the transducer is proportional to the speed of the motor. Hence, if $f$ represents the information rate, $f$ equals $PN/60$ c.p.s.; wherein N represents the motor speed in revolutions per minute and P represents the number of poles per revolution of the transducer (where the optical read-out portion of the transducer is a disc with 20,000 lines, then P will equal 20,000).

Shannon's theorem tells us that the control band limit is $f/2$ c.p.s. When the frequency spectrum of torque perturbations (arising from either external or internal causes or both) includes frequencies greater than $f/2$, the system is functionally inoperative. Internal torque perturbations may arise from the effect of brushes and commutations, etc. Thus as the desired motor speed decreases (that is N decreases) $f$ will decrease to a point where at some motor speed N the band width $f/2$ will be less than the frequency spectrum provided by the various torque perturbations.

Or to put it another way, the rate at which the transducer samples the shaft position will be such that it will miss many of the perturbations caused by torque variations and so will not be able to provide the kind of control necessary to track the reference and overcome these torque variations. It should be understood that the inoperative nature of the previously known system relates to both motor speed and shaft angle position (frequency and phase) control.

Accordingly, it is a broad purpose of this invention to provide a phase and frequency responsive control system that will provide improved control accuracy.

It is a related purpose of this invention to provide the improved control accuracy in the context of a control system that avoids extremely complex and unreliable circuit arrangements.

It is a major purpose of this invention to provide a phase-lock system which will permit effective motor control at very low speeds and, indeed, that will permit a zero speed control.

It is a further purpose of this invention to provide such a system that will be operative over a wide range of speeds from zero speed on up so that a single system can be used where such flexibility is desired.

It is a more specific purpose of this invention to provide a phase-lock multi-speed control system which can take advantage of the information that is available from a continuous read-out shaft angle position.

It is another purpose of this invention to provide a phase-lock control system which in addition to controlling motor speed will provide a more continuous and accurate control over shaft angle position.

SUMMARY OF THE INVENTION

In brief, this invention involves the employment of the technique of generating modulation side bands of a carrier signal from a continuous measurement signal (such as an optical readout) of a device being controlled and from the command signal employed to control the device. In lieu of comparing the readout signal and command signal directly in order to generate the control signal, this invention compares a side band representing the modulation of the carrier signal by the read-out signal with a side band representing the modulation of the carrier signal by the command signal. In this fashion, the read-out signal is converted into a much higher frequency measurement signal so that much greater advantage is taken of the information inherently possessed by a continuous read-out signal. Accordingly, it becomes possible to obtain a much more accurate control over the shaft angle position of a motor at very low speed and even at zero speed. It also means that perturbations up to any desired frequency level can be controlled, even at zero speed, by selection of a high enough carrier signal frequency.

BRIEF DESCRIPTION OF THE DRAWINGS

Other objects and purposes of this invention will become apparent from the following detailed description and drawings, in which:

FIG. 1 is a block diagram of a first embodiment of this invention;

FIG. 2 is a schematic diagram of a specific translator that may be used in the transducer to make operative the device of this invention;

FIG. 3 is a block diagram of a second embodiment of this invention;

FIG. 4 is a schematic diagram of a specific translator that will function in the FIG. 3 embodiment;

FIG. 5 is a block diagram representing a third embodiment of this invention;

FIG. 6 is a block diagram of a fourth embodiment of this invention; and

FIG. 7 is a schematic diagram of a specific digital to analog translator that will function in the FIG. 6 embodiment.

DESCRIPTION OF THE PREFERRED EMBODIMENTS

The FIG. 1 embodiment

In FIG. 1, statis optical read-out 12 is coupled to the shaft 13 of a motor 14 so as to provide two output signals, both of which are sinusoidal representations of the shaft 12 angle position. These two sinusoidal outputs from the statis read-out 12 are 90° out of phase with one another and thus one may be represented by the equations $k \sin \phi$ and $k \cos \phi$. There are a number of readily obtainable static read-out devices which will provide this kind of an output when coupled to the shaft of a motor. Such read-out devices include standard optical read-out devices and resolvers.

A translator 16 performs the function of modulating a carrier signal, $A \sin 2\pi f_c t$, which is supplied from the carrier source 18, with the static read-out 12 outputs $k \sin \phi$ and $k \cos \phi$, to provide a translator 16 output $B \sin (2\pi f_c t + \alpha \phi)$, which will be designated as "S" herein. FIG. 2 illustrates a complete schematic of a particular translator 16 which will function to accept the three inputs mentioned and provide the desired output. The read-out 12 together with the carrier source 18 and translator 16 constitute the transducer. The transducer 12, 16 and 18 performs the function of transforming shaft 13 rotation into the desired output S.

It should be noted that the translator 16 output S is the same as the upper side band of a carrier signal having the frequency $f_c$ which has been amplitude modulated by one of the two optical read-out 12 outputs. In a preferred embodiment, such a procedure is not followed primarily because of the filtering problems that would be entailed. A carrier frequency of 15 kc. when amplitude modulated by signals having a frequency in the order of a few c.p.s. has side bands which are too close to the carrier to be separated by filtering. Accordingly, the cosine function as well as the sine function is needed so as to be able to employ the phasing method of single side band generation. Once it is recognized that this particular type of modulation is desired, a number of translators can be designed with the desired transfer function. FIG. 2 is a schematic of only one such translator.

At this point it might be noted that this invention does not involve any particular means for obtaining a single side band transducer output as much as it involves the use of a single side band transducer output as the information signal which is to be compared with a reference signal in a phase-lock control system.

It should be noted that only one of the two side bands is employed at any one time.

In this fashion there is provided a transducer signal S which has as high a frequency as may be desired and carried continuous shaft 13 angle position information (including shaft speed information) by means of the frequency and phase deviation from the carrier source frequency $f_c$. Why and how this is so can best be understood after examining the rest of the loop and after understanding how it is that the reference signal R controls motor 14 speed.

The reference source 20 supplies a reference signal R which can be expressed as: $C \sin 2\pi (f_c + f_d)t$. A phase detector 22 compares the signals R and S to provide control signal output $E_c$ which has an average D.C. value that is proportional to the relative electrical phases of the two input signals R and S. The magnitude of $E_c$ determines the power input to the motor and thus when the R frequency differs from the S frequency there will be a change in power input to the motor that will serve to bring the S frequency to exactly equal the R frequency. The two frequencies R and S will then maintain a phase difference adequate to supply enough power to the motor to overcome whatever loads are on the motor. Accordingly, the selection of $f_d$ determines motor speed.

In the equation for the signal S, $\alpha$ is a constant determined by the particular translator 16 and $\phi$ can be generally expressed by the equation $\phi = k_1 Nt + 0$, where N stands for the speed of the motor 14 in r.p.m. and $k_1$ is a constant that depends on the number of poles per revolution of the optical read-out device 12. By substitution in the equation for S, there is obtained:

$$S = B \sin[(2\pi f_c + k_1 N)t + \alpha 0]$$

Since the frequency of S is made equal to the frequency of R by operation of the loop, it follows that $k_1 N = 2\pi f_c$. Thus it can be seen from the equations how motor speed N is related to the reference signal R frequency.

Of major importance is the fact that when $f_d$ is set at zero, N must be zero and yet there will be two signals, S and R, having any desired pre-determined frequency $f_c$ through which control over the motor may be maintained. In such a case, the motor shaft 13 will attain an angle sufficient to provide a phase difference between R and S that will in turn provide an $E_c$ adequate to overcome the load on the motor. Thus zero speed control can be attained with the device of this invention.

The stabilization block 24 is indicated solely as a reminder of the fact that in a closed loop servo system such as this, some dynamic stabilization will always be required. It is known in this art that dynamic stability for the loop will be required and it is also known as to what kinds of circuitry should be incorporated to supply the requisite stability. Accordingly, there is no need to go into the details of the stabilization block 24.

The control signal $E_c$ is used to control the magnitude of the power output of a power amplifier 26. The power amplifier supplies the power required by the motor 14 to overcome whatever load is on the motor 14. A fairly high degree of power amplification is desirable so as to maximize the phase control that is available over the position of the motor shaft 13.

From the point of view of information analysis, the technique of this invention provides improved control because it permits the use of a continuously varying optical read-out signal (i.e.: $k \sin \phi$). By contrast, previously known phase-lock motor speed control systems generate a series of pulses, the number generated for each 360° rotation of the shaft being equal to the number of lines on the disc in the optical read-out portion of the transducer. These transducer pulses form the information signal S are compared with a series of pulses from a reference source, which series of pulses form the reference signal R. By techniques known to the art, the phase and frequency of these pulses are used to control the speed of the motor and, to some extent, the shaft angle of the motor. However, since only one pulse is provided for each 360° of sin $\phi$, the rest of the shaft position information that is generated by the sin $\phi$ signal is lost. At relatively high motor speeds, this loss of information does not seriously matter since the torque perturbations which it is desired to overcome generally have a frequency considerably less than the pulse train frequency provided by the transducer. But at low speeds the loss of information raises the problems discussed previously so that there is a speed below which the previously known systems become inoperative.

Accordingly, it is a major contribution of this invention that it makes possible the use of all the information that is available from the optical read-out 12. The $k \sin \phi$ signal gives continuous information from the shaft 13 angle position and, since this signal continuously amplitude modulates the carrier signal, the transducer output S contains a great deal more information than is available from the sampling technique inherent in the previously employed pulse train transducer signal.

Thus, from one point of view, it is the use of the full optical read-out 12 signal that makes possible the improvement provided by this invention.

From another point of view, it is the employment of a carrier signal which is modulated by the optical read-out 12 output to provide a higher frequency transducer signal S which makes possible the improved performance available with this invention.

As has been pointed out above, one reason for employing both the sin $\phi$ and cos $\phi$ outputs from the read-out 12 is in order to have a practical translator 16 for obtaining the upper side band by itself as the translator 16 output S. It would be possible to employ just the sin $\phi$ output and, by means of a 90° lag circuit, generate the cos $\phi$ signal from the sin $\phi$ signal. Apart from the undesirability of introducing additional circuitry and the difficulty of obtaining exactly a 90° out of phase signal, there is one additional very important reason why it is preferred that both the sin $\phi$ and the cos $\phi$ signals be obtained directly from the optical read-out 12. The reason is that any errors or distortion in the sin $\phi$ signal are in large part compensated for by employing a cos $\phi$ signal from the same optical read-out device that generates the sin $\phi$ signal. The employment of both the cos $\phi$ and sin $\phi$ signals from this optical read-out 12 tends to cancel any linear errors in the read out 12 output.

However, it should be understood that the employment of both the sin $\phi$ and cos $\phi$ directly from the optical read-out as well as the employment of the phasing method of single side band generation are preferred embodiments of this invention which will result in optimum performance with the equipment presently available. The invention in its broadest terms subsumes the use of a single output from the read-out 12 and/or the use of filtering techniques to obtain a single side band output S.

The FIG. 2 embodiment

The translator 16 circuit illustrated in FIG. 2 is an example of how the translator 16 may be designed. The details of this design would be obvious to one skilled in this art. Therefore, all that need be indicated here is how the circuit functions in broad terms. The input transistors Q1 and Q3 perform an isolation function so that the input signal sees a high impedance. The bridge network 28 in each channel (each bridge 28 consisting of four resistors and four diodes) together with the transformers, T1 and T3 in the sine channel and T2 and T4 in the cosine channel, constitute a pair of balanced modulators which serve to modulate the carrier input with the two optical read-out 12 inputs. The transistors Q2 and Q4 perform an isolation function, having a high input impedance and low output impedance. The resistor R and the capacitor C are important elements, which together constitute a phasing network that cancels out the lower side band and selects only the upper side band. This phasing network function is well known in the art. The operational amplifier 29 is used because it provides an extremely high impedance which is necessary in order to avoid loading the phasing network CR and thus avoid distortion. The transistor Q5 and associated circuitry operates as an amplifier shaping circuit to provide the desired transducer signal S at the collector of the transistor Q5.

The FIG. 3 embodiment

FIG. 3 represents a different embodiment of this invention in which the carrier signal $A \sin 2\pi f_c t$ is introduced into the system 30 by means of using the carrier source 38 as the power supply for the bulb or other source of light in the static optical read-out 32. In the FIG. 3 embodiment of the system, a static optical read-out 32 is coupled to the shaft 33 of the motor 34 that is to be controlled. Again, the exact structure of he satic optical read-out 32 employed may be any one of a number that are known in this art. A carrier source 38 supplies the carrier signal $A \sin 2\pi f_c t$ and thus performs the same function as is performed in the FIG. 1 embodiment. However, this carrier source 18 output is used to modulate the output of the light bulb (or other light source) within the static optical read-out 32 so as to produce two outputs from the optical read-out device 32. These wo outputs are, as indicated in FIG. 3, $A_1 \sin \phi \sin 2\pi f_c t$ and $A_1 \cos \phi \cos 2\pi f_c t$ and are fed as inputs to the translator 36. The translator 36 (the exact circuitry for which is illustrated in FIG. 4) provides a single side band output S which is identical in form to the output of the translator 16 in the FIG. 1 embodiment.

The embodiment of FIG. 3 permits the use of a much simpler translator 36, as illustrated in FIG. 4. The operation of the particular circuitry of FIG. 4 is comparable to the comparable portions of the circuitry of FIG. 2. It is primarily important to recognize that the capacitor C and resistor R operate as a phasing network to select out the upper side band. Again the operational amplifier 29 is used to provide an extremely high impedance so as to avoid loading the phasing network CR.

The FIG. 3 embodiment is simpler and more direct than the FIG. 1 embodiment. But the FIG. 1 embodiment is preferred because of the difficulty in getting the light output to follow the carrier source 38 output.

A yet further embodiment of this invention can be briefly described without a drawing in order to give some feeling for the scope of this basic invention. The grating in the optical read-out 12 could be rotated at carrier frequency $f_c$ and thereby provide an optical read-out 12 output which would directly be a single side band. If the disc portion of the read-out 12 on the shaft 13 were rotating in the same direction as the grating, then the output would be the upper side band. If the disc on the shaft 13 were rotating in the opposite direction from the grating, then the output would be the lower side band. In either case, a single side band output could be obtained and without a further translator unit, would provide the desired transducer signal S. Such an embodiment is not a preferred embodiment because of the difficulty of mechanizing it. The grating would have to rotate at an accurate and constant speed which would be extremely difficult and expensive to obtain. Furthermore, this embodiment would require an additional motor to control the grating and thus would require a speed control circuit for the motor; all of which would entail more in the way of circuitry and expense than is involved in the preferred embodiment illustrated in FIG. 1.

In broad terms, this invention encompasses the injection of a carrier frequency into the operation of the transducer and the modulation of this carrier frequency in such a fashion as to produce either an upper side band or a lower side band (but not both). This side band signal is then compared as to frequency and as to phase with a reference signal so as to produce a control signal that is a function of the frequency and phase difference between the reference signal and the upper side band signal, which control signal is fed to the motor (or other rotary element) to overcome whatever load is on the motor. If the load is zero, then the motor is controlled so that the frequency and phase output of the transducer is identical with the frequency and phase from the reference source. As load is applied to the motor (whether the motor be rotating or stationary) the phase of the output from the transducer will shift to provide a phase difference that will produce a control signal sufficient to overcome the load and lock the motor to the reference signal.

As to frequency, this system is 100% accurate. That is any change in reference source frequency will be reflected in a change in motor rotational speed to produce a transducer output whose frequency tracks with the change in reference source frequency.

As to phase control, this system cannot be 100% accurate but can achieve a remarkable correspondence between the shaft angle position of the motor 14 and the phase of the reference signal R.

The FIG. 5 embodiment

FIG. 5 is a block diagram of a further basic embodiment of the control system of this invention. In order to simplify description, and in view of the above disclosure of the FIG. 1 embodiment, the FIG. 5 block diagram is even further simplified than is the FIG. 1 block diagram. Basically, the FIG. 5 arrangement differs from the FIG. 1 embodiment in that the development of the reference signal R is shown in greater detail.

For greater generality, the controlled system 52 is broadly designated since, as is explained above, the device being controlled need not be a motor or even a rotating shaft. For simplicity, the optical read-out (or other equivalent device) which is coupled to the control system so as to provide the outputs $k \sin \phi$ and $k \cos \phi$ is subsumed under the controlled system block 52. The carrier source 54 performs the same function as does the carrier source 18 in FIG. 1 in that it provides a relatively higher frequency signal $f_c$ (which may be 15 kc., for example; in frequency). The measurement signal translator 56 performs the same function as does the translator 16 in FIG. 1 to provide a "transducer" signal S which is a side band of the carrier signal $f_c$. The frequency and phase comparator 58 performs the same function as does the phase detector 52 in FIG. 1 in that it compares two input signals to provide the control $E_c$ for controlling the parameter which is being measured in the controlled system 52.

Where FIG. 5 is more specific is in illustrating a very important refinement to the FIG. 1 embodiment which involves the generation of the reference signal R as a side band of the same carrier signal $f_c$ that is employed to provide the side band signal S. Thus, the reference source 20 in FIG. 1 is broken out in FIG. 5 as a command signal generator 60 and a reference translator 62 and is further specified by the fact that the carrier source 54 output $f_c$ is applied to the reference translator 62.

The command signal generator 60 generates two signals in quadrature which, as described above, means that when controlling the controlled system 52 to a standstill, the two outputs from the command signal generator 60 are two D.C. levels which, as they change in value in order to shift the stand still position being commanded, will vary in a sinusoidal fashion in quadrature with one another. The reference translator 62 then operates in the fashion described in connection with the FIG. 2 translator to provide the reference signal R which is a side band of the carrier signal $f_c$ just as the "transducer" signal S is a side band of the carrier signal $f_c$.

The importance of generating the reference signal R by using the same carrier signal that is used to generate the transducer signal S, is that it assures that deviations of the carrier signal $f_c$ from an assumed perfect sinusoid will not have unwanted effect because such deviation will be reflected in both of the signals applied to the comparator 58 and thus will cancel out and have no effect on the control signal $E_c$. This relationship of the signals R and S to a common carrier is assumed by the equations shown in FIG. 1 in which the carrier frequency $f_c$ is designated in the equations for both the measurement signal S and the reference signal R. However, FIG. 5 indicates this arrangement explicitly and shows one manner in which the result is achieved.

The nomenclature "phase detector" or "phase comparator" has been used to broadly designate the unit 22 or 58 which compares the "transducer" signal S and the reference signal R to provide the control signal $E_c$. Phase comparators of the type well known in the art may be used when the controlled system 52 (or motor 14) is being controlled to a standstill. But where frequency as well as phase (for example, motor rotational speed as well as shaft angle position) is being controlled, the comparator unit involved is preferably of a more special or specific type known as a frequency and phase comparator. Such frequency and phase comparators are known in the art and function to respond to a frequency difference until the two signals are brought into frequency lock and than to respond to the phase difference between the two signals in the same fashion as does a phase comparator. When broadly conceived, a phase comparator function is one that subsumes the kind of comparison that occurs when the frequency of the two signals being compared differs. Of necessity the phase relationship between the two signals is always continuously shifting when their frequencies differ. However, in order to avoid run away conditions on overshoot, the preferred design when a comparison must be made between two signals having different frequencies is a frequency and phase comparator. Accordingly, in FIGS. 5 and 6, the comparator unit is designed as a frequency and phase comparator 58. However, it should be understood herein that the term phase comparator is intended to include frequency and phase comparators.

The FIG. 6 embodiment

The FIG. 6 embodiment is very similar to the FIG. 5 embodiment except that a digital command signal generator 64 is employed to provide the command reference. A digital to analog reference translator 68 is employed to provide the desired reference signal R which is a side band of the carrier signal $f_c$. The digital command signal generator 64 is simply a broad designation of any source of digital signal. It could be the output of a multi-track tape or of a computer. In any case, the digital reference command would normally be presented simultaneously to the translator 68 and thus the command signal input to the translator 68 is shown as a thick line in order to suggest a number of lines equal to the number of bits involved.

This digital to analog reference translator 68 performs the function of converting the reference command in digital form to an analog reference signal R that has a side band relationship to the carrier signal $f_c$. It may aid in understanding the operation of this translator 68 to consider it as being comprised of two separate units. The first unit would be a digital to analog converter of a known type which converts the digital command to a quantized analog signal. The second unit would then be a translator, such as the translators 16 and 56, which would take the quantized analog signal output from the digital to analog converter and provide the desired side band reference signal R. In connection with this use of a digital command, it should be understood that the digital signal is a digital representation of a sinusoidal signal, or, more precisely, each digital input value corresponds to a particular value along a sinusoidal signal.

FIG. 7 illustrates a block and schematic of a digital to analog translator which could be used as the reference translator 68 in the FIG. 6 embodiment. It is simply an example of a translator that might be employed. The details of this design or of some other design to perform this same function would be known to those skilled in this art. Therefore, as with the FIG. 2 translator, all that need be indicated here is how the FIG. 7 circuit functions in broad terms.

In FIG. 6, the two inputs to the translator 68 are the carrier signal $f_c$ and the digital reference command. These are shown in FIG. 7 with the digital reference command being indicated as a four bit whole word input in order to serve as an example. In addition positive and negative D.C. voltage levels, $+E_r$ and $-E_r$ are shown. These voltage levels serve as voltage references for developing the appropriate sinusoidal voltage level output. The operation of the FIG. 7 device can be most readily explained if it is assumed that the four bit commnad signal input is cycling through the sixteen possible levels which four bits permits so that an output is being generated which is a series of sixteen voltage levels in succession that correspond to sixteen successive points spaced 22½ degrees apart on a sinusoidal curve. The four bit command is applied to a binary to decimal converter 80, which converter 80 provides sixteen separate outputs to each switching matrix 82 and 82′.

The immediately following description will be limited to the digital to sine converter section 84 since the digital to cosine converter 84′ function in a completely analogous fashion. Each of the sixteen outputs from the converter 80 is connected to a separate one of sixteen switches in the maxtrix 82. The particular one of the sixteen outputs of the converter 80 that carries voltage at any given time serves to cause the particular one of the sixteen switches in the matrix 82 to which it is connected to conduct thereby connecting one of the two D.C. input levels (either $+E_r$ or $-E_r$) to the appropriate one of the sixteen resistors $R_1$ through $R_{16}$.

The switches in the matrix 18 can conveniently be field effect transistor switches which are turned on by virtue of a voltage being applied to the appropriate gate through the one of the sixteen converter 80 outputs to which it is connected. Each of half of the switches in the matrix 82 are connected between the positive D.C. voltage $+E_r$ and a respective one of the output resistors $R_1$ through $R_{16}$ to represent the positive half of the sine wave. Each of the other half of the switches in the matrix 82 are connected between the negative input voltage $-E_r$ and a respective one of the output resistors $R_1$ through $R_{16}$. A separate output resistor $R_1$ through $R_{16}$ is connected to a separate one of the sixteen switches in the matrix 82. An operational amplifier 86 with a feedback resistor $R_f$ essentially provides isolation. The magnitude of the successive resistors will decrease in value until the magnitude of the resistor $R_5$ (which corresponds to the 90° and therefore maximum voltage level point of the sine wave). The resistor $R_5$ is equal in magnitude to the feedback resistor $R_f$. Accordingly, the output from the converter 84 at the 90° point will be $+E_r$. In brief, the envelope of the conductance of the resistors $R_1$ through $R_{16}$ is a sine wave.

Accordingly, if the four bit command cycles at a frequency $f_s$, the output of the converter 84 will be sixteen step series of voltage levels whose envelope will represent the sinusoidal function indicated having a frequency $f_s$.

The operation of the digital to cosine converter 84′ is completely analogous so as to generate the corresponding cosine form.

The carrier signal $f_c$ and the sinusoidal signal from the converter 84 are applied to a balanced modulator 88 which may be of the ring type shown in FIG. 2) so as to provide a suppressed carrier amplitude modulated output as indicated. The balanced modulator 88′ performs exactly the same function for the cosine output of the converter 84′ to provide the suppressed carrier output indicated.

In order to separate the upper and lower side bands, the resistor-capacitor (RC) summing networks shown are employed. The capacitor $C_1$ and $C_2$ can be considered equal as can the resistors $R_n$ and $R_m$. More importantly, the capacitors are selected so that at the carrier frequency $f_c$, their capacitive reactance $X_c$ is equal to the resistance of the resistors $R_n$ and $R_m$. As a consequence, the summing operation of the capacitor $C_1$ and the resistor $R_m$ produces the lowerside band as indicated and the summing operation of the capacitor $C_2$ and the resistor $C_n$ produces the upper side band as indicated.

In FIG. 6, as in the other figures, only one of the two side bands is shown as being applied to the phase comparator 58. Thus normally only one of the two outputs from FIG. 7 will be used. However, where a device being controlled in the control system 52 is bi-directional (as might be the case where the device being controlled is a valve), then it might be necessary to actually use both the upper side band the lower side band outputs of the device shown in FIG. 7. In such a case, an appropriate switching mechanism would be necessary in order to switch from applying one of the two side bands to applying the other side band to the comparator 58. Thus both upper and lower side bands can be employed in a given system although only one of the two side bands would be used at any given point in time. With the valve example in mind, if the digital command were holding the valve stem at a stand still by means of the reference R output from the junction between capacitor $C_2$ and resistor $R_n$ and it was desired to move the valve stem in a direction requiring a lower side band reference R, then an appropriate switching signal would be applied to a switching network between the FIG. 7 outputs and the phase comparator 58 input.

In one embodiment, the motor 14 is equipped with a static optical read-out 12 that has 64,000 lines per revolution. Thus 20 seconds of arc represents 360 electrical degrees in the output from the translator 16. If we assume that 360° difference between the phase of the translator 16 output and the reference source 20 output provides full power to the motor, then the motor 14 canbe controlled as to shaft angle position within 20 seconds of arc. However, the power amplifier 26 can be designed to provide a loop gain of 100 thereby making it possible to supply full power to the motor with a phase difference of 3.6° between the transducer signal S and the reference signal R. This means that the shaft position of the motor can be controlled to one part in 6.4 million. Another way of looking at it is to say that perturbations (mechanical jitter generally) can be reduced to about ⅙-millionth of their uncompensated magnitude.

The fact that the phase position of the motor 14 shaft 13 cannot be 100% controlled should not obscure the fact that a change in shaft angle position can be completely controlled. Thus if the reference signal R shifts by 5°, the shaft position on the motor 14 will shift by an amount sufficient to cause a 5° shift in the phase angle of the transducer signal S; thereby maintaining the phase difference between signals S and R constant at the amount necessary to provide a control signal $E_c$ sufficient to overcome the load on the motor 14. Such a relationship might be particularly desired where the reference R is supplied by a master motor and is used to control the motor 14 as the slave motor. This last point concerning the ability of the controlled motor 14 to track with a change in the reference signal R is merely a specific way of pointing out that there is complete frequency control at all frequencies no matter how low the frequency may be.

The performance available from this system can be appreciated by reference to one embodiment which is built to control a motor between 0.01 r.p.m. and 100 r.p.m. where the motor has to take a load up to 4½ foot pounds. In that particular system, the motor was able to tolerate 100% torque perturbations and yet remain in synchronism to better than one arc-second.

The invention has been described in detail through various preferred embodiments. Additional variations available in all embodiments have been indicated. Other variations and embodiments will be evident to those skilled in this art. Accordingly, it is intended that all variations within the true scope of the invention are to be covered in the following claims.

What is claimed is:

1. A control system adapted to control a parameter in a controlled system, said parameter being represented by the phase and frequency of a transducer signal, comprising:
    a carrier signal source to provide a carrier signal,
    read-out means coupled to the controlled system for providing a measurement signal having phase and frequency representing said parameter,
    first translator means responsive to said carrier signal and to said measurement signal to provide said transducer signal as a single side band signal having a side band relationship to said carrier signal,
    reference source means to provide a reference signal, and
    comparator means for comparing the phase relationship between said reference signal and said single side band transducer signal to provide a control signal adapted to control said parameter in said control system.

2. The control system of claim 1 wherein said parameter being controlled is the position and speed of a movable element and wherein said read-out means is a static optical read-out to provide said measurement signal as first and second continuous sinusoidal measurement signals in quadrature.

3. The control system of claim 1 wherein said comparator means is a frequency and phase comparator to provide both dynamic and static control of said parameter.

4. The control system of claim 1 wherein said reference source means comprises:
    a command signal generator to provide a command signal, and
    second translator means responsive to said carrier signal and to said measurement signal to provide said reference signal as a single side band signal having a side band relationship to said carrier signal.

5. The control system of claim 4 wherein said parameable element and wherein said read-out means is a static able elemetn and wherein said read-out means is a static optical read-out to provide said measurement signal as first and second continuous sinusoidal measurement signals in quadrature.

6. The control system of claim 5 wherein said comparator means is a frequency and phase comparator to provide both dynamic and static control of said parameter.

7. The control system of claim 5 wherein said command signal comprises first and second sinusoidal command signals in quadrature.

8. The control system of claim 7 wherein said command signals are continuous sinusoidal signals.

9. The control system of claim 1 wherein said reference source means comprises:
    a digital command signal source to provide an $n$ bit command signal, and
    a digital to analog translator responsive to said $n$ bit command signal and to said carrier signal to provide said reference signal as a single side band signal having side band relationship to said carrier signal.

10. The control system of claim 9 wherein said comparator means is a frequency and phase comparator to provide both dynamic and static control of said parameter.

11. The control system of claim 9 wherein said digital to analog translator comprises:
    a digital to analog converter responsive to said $n$ bit command signal to provide first and second sinusoidal command signals in quadrature, and
    translator means responsive to said carrier signal and to said command signals in quadrature to provide said single side band reference signal.

12. A control system adapted to control a parameter in a controlled system, said parameter being represented by the phase and frequency of a transducer signal, comprising:
    a carrier signal source to provide a carrier signal,
    transducer means responsive to said carrier signal and to said parameter to provide said transducer signal as a single side band signal having a side band relationship to said carrier signal,
    a command signal generator to provide a command signal,
    first translator means responsive to said command signal and to said carrier signal to provide said reference signal as a single side band signal having a side band relationship to said carrier signal, and comparator means for comparing the phase relationship between said single side band reference signal and said single side band transducer signal to provide a control signal adapted to control said parameter in said control system.

13. The control system of claim 12 wherein said comparator means is a frequency and phase comparator to provide both dynamic and static control of said parameter.

14. The control system of claim 12 wherein said command signal comprises first and second sinusoidal command signals in quadrature.

15. The control system of claim 14 wherein said command signals are continuous sinusoidal signals.

16. The control system of claim 12 wherein:
said command signal generator provides an $n$ bit command signal, and
said first translator means is a digital to analog translator responsive to said $n$ bit command signal and to said carrier signal to provide said reference signal as a single side band signal having side band relationship to said carrier signal.

17. The control system of claim 16 wherein said comparator means is a frequency and phase comparator to provide both dynamic and static control of said parameter.

18. The control system of claim 16 wherein said first translator means comprises:
a digital to analog converter responsive to said $n$ bit command signal to provide first and second sinusoidal command signals in quadrature, and
translator means responsive to said carrier signal and to said command signals in quadrature to provide said single side band reference signal.

References Cited

UNITED STATES PATENTS

| | | |
|---|---|---|
| 2,743,362 | 4/1956 | Leed. |
| 2,819,438 | 1/1958 | SantAngelo. |
| 3,098,186 | 7/1963 | Williamson et al. |
| 3,340,451 | 9/1967 | Farrand. |

ORIS L. RADER, Primary Examiner

T. E. LYNCH, Assistant Examiner

U.S. Cl. X.R.

318—28, 313, 314

UNITED STATES PATENT OFFICE
CERTIFICATE OF CORRECTION

Patent No. 3,462,663

August 19, 1969

Michael S. Schiller

It is certified that error appears in the above identified patent and that said Letters Patent are hereby corrected as shown below:

Column 5, line 21, "$f_c$" should read -- $f_d$ --. Column 7, line 4, "he" should read -- the --. Column 8, line 34, after "control" insert -- signal --. Column 9, line 22, "designed" should read -- designated --. Column 10, line 53, before "which" insert -- ( --. Column 12, line 30, after "param-" insert -- eter being controlled is the position and speed of a mov- --; line 32, cancel "able elemetn and wherein said read-out means is a static".

Signed and sealed this 19th day of May 1970.

(SEAL)
Attest:

Edward M. Fletcher, Jr.
Attesting Officer

WILLIAM E. SCHUYLER, JR.
Commissioner of Patents